(12) United States Patent
Sogaard et al.

(10) Patent No.: US 8,387,564 B2
(45) Date of Patent: Mar. 5, 2013

(54) CONTROLLING A DAIRY STABLE

(75) Inventors: Jan Sogaard, Sjoerup (DK); Frede Moellin Ottesen, Ringe (DK)

(73) Assignee: GEA Farm Technologies GmbH, Boenen (DE)

( * ) Notice: Subject to any disclaimer, the term of this patent is extended or adjusted under 35 U.S.C. 154(b) by 401 days.

(21) Appl. No.: 12/440,100

(22) PCT Filed: Sep. 5, 2007

(86) PCT No.: PCT/DK2007/000398
§ 371 (c)(1),
(2), (4) Date: Mar. 12, 2009

(87) PCT Pub. No.: WO2008/028488
PCT Pub. Date: Mar. 13, 2008

(65) Prior Publication Data
US 2009/0272325 A1  Nov. 5, 2009

(30) Foreign Application Priority Data
Sep. 5, 2006 (DK) .................................. 2006 01144

(51) Int. Cl.
*A01J 5/007* (2006.01)
*A01K 1/12* (2006.01)
(52) U.S. Cl. ................. 119/14.02; 119/14.03; 119/14.18
(58) Field of Classification Search ............... 119/14.01, 119/14.02, 14.03, 14.18, 51.02, 14.14, 14.15, 119/14.17, 14.08
See application file for complete search history.

(56) References Cited

U.S. PATENT DOCUMENTS

| 2,039,562 | A | * | 5/1936 | Shodron | 119/14.03 |
|---|---|---|---|---|---|
| 4,000,718 | A | * | 1/1977 | Brown | 119/14.03 |
| 4,452,175 | A | * | 6/1984 | Thompson et al. | 119/14.03 |
| 4,771,007 | A | * | 9/1988 | Tippetts et al. | 436/150 |
| 5,771,837 | A | * | 6/1998 | van der Lely | 119/14.02 |
| 5,950,562 | A | * | 9/1999 | Schulte et al. | 119/51.02 |
| 6,073,580 | A | * | 6/2000 | Graupner et al. | 119/14.08 |
| 6,257,169 | B1 | * | 7/2001 | Oosterling | 119/14.02 |
| 7,255,063 | B2 | * | 8/2007 | Van Den Berg et al. | 119/14.03 |
| 7,484,474 | B2 | * | 2/2009 | Van Den Berg et al. | 119/14.02 |

(Continued)

FOREIGN PATENT DOCUMENTS

| DE | 103 50 844 A1 | 6/2005 |
|---|---|---|
| EP | 0 677 243 A2 | 10/1995 |
| EP | 0 853 875 A2 | 7/1998 |
| EP | 1 070 452 A2 | 1/2001 |

(Continued)

*Primary Examiner* — Rob Swiatek
*Assistant Examiner* — Ebony Evans
(74) *Attorney, Agent, or Firm* — Roberts Mlotkowski Safran & Cole, P.C.; David S. Safran

(57) ABSTRACT

A dairy stable (5) and a method for controlling a stable (1), preferably a dairy stable (5) for milking livestock (4), having at least one milking system including at least one, preferably automatic, milking stations (8, 9, 12, 13, 14), and where the individual animal's access to milking is controlled, preferably via a transponder or similar on the animal. Furthermore, a milking station (8, 9, 12, 13, 14) for use in connection with a method and a dairy stable (5). In this manner, it is ensured that, within a given time interval, all animals (4) are guided to one or more selected milking stations (8, 9) at least once, where the selected milking station or stations (8, 9) are adapted in a special way with test equipment for determining various conditions of or at the milk and differently as compared to other milking stations (12, 13, 14).

12 Claims, 1 Drawing Sheet

U.S. PATENT DOCUMENTS

| | | | |
|---|---|---|---|
| 2003/0172876 A1* | 9/2003 | Ornerfors | 119/14.02 |
| 2005/0223997 A1* | 10/2005 | Umegard | 119/14.03 |
| 2006/0249082 A1* | 11/2006 | Holmertz et al. | 119/14.02 |
| 2006/0266293 A1* | 11/2006 | Fink et al. | 119/14.02 |
| 2006/0283269 A1* | 12/2006 | Anderson et al. | 73/863.31 |
| 2007/0209594 A1* | 9/2007 | Kaever et al. | 119/14.02 |
| 2008/0282985 A1* | 11/2008 | Schulte | 119/14.02 |
| 2010/0068345 A1* | 3/2010 | Tamminga et al. | 426/72 |

FOREIGN PATENT DOCUMENTS

| | | |
|---|---|---|
| EP | 1 709 867 A1 | 10/2006 |
| EP | 1709867 A1 * | 10/2006 |
| NL | 8602505 A | 5/1988 |
| WO | 03/086058 A1 | 10/2003 |
| WO | 2004/008844 A1 | 1/2004 |
| WO | 2004/107852 A1 | 12/2004 |
| WO | 2006/098678 A1 | 9/2006 |

* cited by examiner

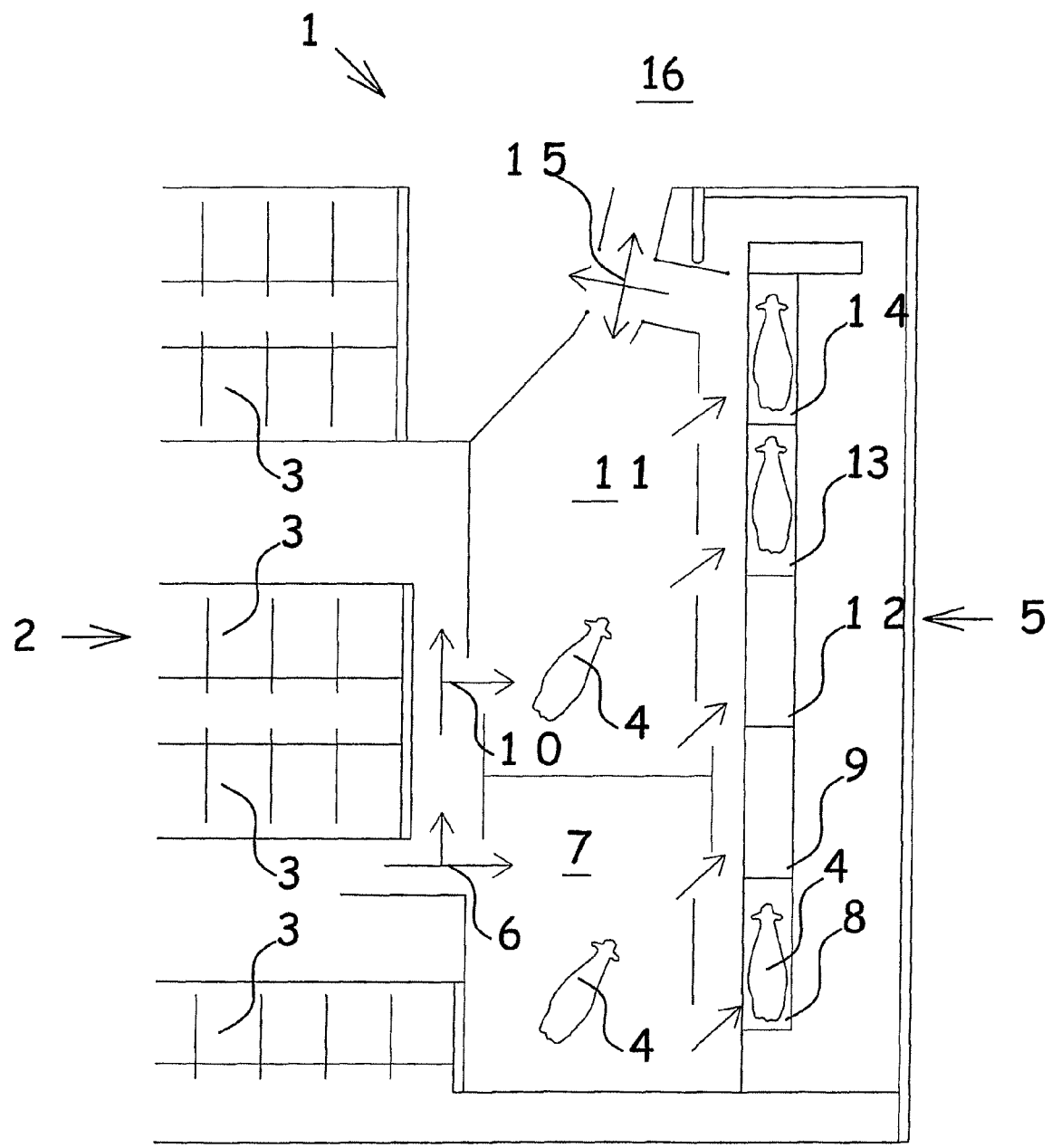

CONTROLLING A DAIRY STABLE

BACKGROUND OF THE INVENTION

1. Field of Invention

The present invention concerns a dairy stable and a method for controlling a stable, preferably a dairy stable for milking livestock, having at least one milking system including one or more milking stations, preferably automatic milking stations, and where the individual animal's access to milking is controlled, preferably via a transponder or similar on the animal. The invention furthermore concerns a milking station for use in connection with a method and a dairy stable according to the invention.

2. Description of Related Art

In connection with milking livestock, checking the quality of the milk is commonly known. This quality control may be performed in many different ways. A much used way is manual, visual check, where the milk from each single teat is manually milked out in a small container and inspected manually subsequently. The container may contain a test liquid acting on the milked milk in such a way that it can be decided whether the cell count is above or below an acceptable number. Another method is taking out milk samples that are sent for analysis in a laboratory. This method is sure and good, but it is not fast enough in order to be attractive as the only checking means. Finally, electronic equipment may be fitted in connection with the milking system. This test equipment may be disposed centrally in connection with the pipe system of the milking system or it may be disposed locally at each milking station. The centrally disposed test equipment has obviously the drawback that it does not appear which animal is delivering milk with too inferior quality, as several animals are milked simultaneously. This problem can be solved with the locally disposed test equipment where data for the milk quality can be registered and processed instantly. However, this solution has the drawback that expensive test equipment is to be installed at each single milking station.

From U.S. Patent Application Publication 2006/0191485 A1 a method and a device for measuring the quantity of milk for statistic purposes are known. In this device only a number of the milking places are equipped with measuring equipment. By randomly performing milking of a herd of animals, the quantity of milk can be established and the data can be used to control feeding. Using this device and method with only one entrance line to the milking places, where the animals line up, the animals tend to become stressed as they are prohibited from moving freely around while waiting to be milked. Although it has been described in this document to have two entrance lines, one for animals pre selected for measuring and one for the rest, it still results in a number of animals waiting in a narrow row in front of the entrance to the milking stations, while being impatient to be milked.

It is thus desirable to prevent that milk with inferior quality is mixed with good milk, and therefore it is important that the milk is tested at the individual animal so that milk which does not fulfill the quality requirements can be conducted for collection in a separate system.

It is the purpose of the invention as disclosed below to indicate solutions that provide possibility of good and secure milk control in connection with milking of the individual animal, where drawbacks as described above and manual sampling are avoided. It is furthermore the object of the invention to indicate a milk control system which is particularly suited for partially and fully automatic dairy stables.

SUMMARY OF THE INVENTION

By a method according to the invention it is ensured that within a given time interval, all animals are guided to one or more selected milking stations at least once, where the selected milking station or stations are adapted in a special way and differently as compared to other milking stations. Thus it becomes possible to have a dairy stable with a plurality of milking stations where only a few milking stations are equipped with expensive test equipment for checking the milk quality. In a dairy cattle stock where an automatic milking system is used, as, e.g., a TITAN robot milking system, this is milking each cow about 2.5-3 times a day. By guiding each dairy cow into a selected milking station at least once a day, a sufficient and good monitoring of the well-being of the individual animals is ensured.

By a preferred method for controlling a stable according to the invention and by a preferred embodiment of a milking station according to the invention, the selected milking station or stations are provided with means for detecting special properties of the milk only from the animal concerned. These means may particularly be adapted for determining the quality of the milk on the basis of somatic cell count, germ count, conductivity, colour deviation and/or other properties of the milk. Rapid action against e.g. incipient inflammation of the udder is hereby enabled.

In a further variant of a method according to the invention, the selected milking station or stations are provided with means for medicating only the animal concerned. This may be effected by dosing medicine in a feed trough disposed inside the milking box itself. This dosing of medicine may take place by the medicine being mixed into a small portion of compound feed which is used as kind of reward for seeking a milking station. A clear advantage of this is that a veterinarian or other person who is to treat a certain animal does not have to search for that animal in a large herd.

In yet a variant of a method for controlling a stable according to the invention, conditions at the specific animal or its milk are used as input for further controlling the animal's way out of the milking station. The animal is, e.g., led into a special section of the stable where other animals with the same symptoms are also led. The advantage of this is that the animals to be attended and possibly treated, —e.g., by a veterinarian—are sorted out from the other animals. This is a clear advantage as a stock of animal husbandry may easily include several hundred animals that go freely around in large loose-housing stables. Alternatively, there may be performed various sortings based on conditions at the milk, temperature of the animal or other. Another advantage of sorting out animals with deviating milk quality or other symptoms from the remaining herd is if there is an outbreak of an infectious disease. In such situations it is important to separate the sick animals from the fit, so that the entire herd is not infected.

Data for individual animals may furthermore entail that subsequent milking is to occur in a selected and monitored box. Animals with particularly aberrant milk quality or with other signs of problems with the animal may, e.g., be led to a milking station where it may be attended by a veterinarian or similar next time it is milked. Thus there may be different degrees of specially adapted milking stations.

The invention furthermore includes a dairy stable with milking stations, preferably automatic milking stations, which are provided with a distribution system which on the basis of the identity of the individual animal ensures that it is given access to at least one selected milking station at least once within a given time interval, where at least the milk from the animal concerned is examined more closely, and where data regarding the animal are registered and stored by means adapted therefor. As mentioned previously, a cow is milked about 2.5-3 times a day, and at least once a day it is ensured that each single animal is milked in a specially adapted milking station. During or immediately after this milking, measurements are performed on the milk of the individual animal. If something is wrong with the milk, this is registered in the computer system of the dairy stable, and the animal can be led into a special area of the stable, or be led back to the normal part of the stable.

In order to ensure that the capacity of a dairy stable for milking livestock according to the invention is not too small, the system is provided with a distribution system ensuring that an animal which has already visited a selected milking station at least once within the given time interval is only given access again to a selected milking station within the given time interval if a predetermined part of the stock already has visited a selected milking station. In this way one may, e.g., suffice with having one or two out of five milking stations equipped with test equipment. If all animals in a stock already have been milked once in the milking stations with test equipment, these may enter milking of animals that have been tested already. Alternatively, there may be produced statistic models for determining if the capacity is large enough for the special milking stations to engage in milking already tested animals before all have been tested at least once. For example, it may be so that when between 50% and 100% of the stock has been milked, there is opened for taking in already tested animals, but preferably it may be between 90% and 100% of the animals that have to pass through the system before opening for already tested animals.

In order to attain optimal capacity in a dairy stable for milking animals according to the invention where an animal seeking the milking system for milking has already visited a selected milking station at least once within the given time interval, the distribution system may advantageously ensure that the animal is preferably guided to a milking station without special means. Thus the special milking stations are kept accessible for the animals that have not yet visited them within the latest period of time.

The invention is described in more detail with reference to the drawing.

BRIEF DESCRIPTION OF THE DRAWING

The sole FIGURE shows an overview of a part of a dairy stable according to the invention.

DETAILED DESCRIPTION OF THE INVENTION

In FIG. 1 is seen an overview of a part of a cowhouse 1. The FIGURE shows a possible design of a cowhouse 1 according to the invention. At the extreme left appears the area 2 in the stable 1 where there are bed boxes 3. The cows 4 stays in this area 2 most of the time. When some time has passed since a cow 4 has been milked and is needing to be milked again, the cow 4 seeks the dairy stable 5. In order to come into the dairy stable 5, the individual cow 4 has to go through a pre-selection gate 6. If a cow 4 has not been selected previously for checking within the last 24 hours, it is given access to a waiting area 7. In the shown embodiment, two milking stations 8, 9 are associated with this waiting area 7. However, if a cow 4 already has been selected for checking in milking station 8 or 9, it is allowed to pass the pre-selection gate 6 and is led on to a second pre-selection gate 10. At the second pre-selection gate 10, the cow 4 is either led into the waiting area 11 or back to the area 2 with bed boxes 3 or to a not shown stable section for feeding.

After the cow 4 has waited in the waiting area 7 or 11 and has been milked in one of the milking stations 8, 9, 12, 13 or 14, the cow 4 is led through a post-selection gate 15, where the cow 4 may either be led back to the waiting area 11 if the milking is unsuccessful and has to be repeated, or be led to a separation area 16 if something is wrong with the cow 4 or its milk quality or if the cow 4 is to be selected for some other reason. Finally, the cow 4 may also be led to the area 2 with bed boxes 3 or to a not shown stable section for feeding.

It is obvious that during the construction of a dairy stable, one skilled in the art will be able to design a dairy stable with another layout and arrangement other than the solution shown and described here. Such a solution, which is based on the described principles or related variants thereof, may thus be regarded as included by the present description.

What is claimed is:

1. A method for controlling a dairy stable, for milking livestock, having at least one milking system including a plurality of automated milking stations and wherein an individual animal's access to milking is controlled, via a transponder on the animal, where at least once each day, all animals of the milking livestock, irrespective of the number of animals, are guided to at least one monitoring milking station, at least once, where the at least one monitoring milking station differs from the automated milking stations by being provided with means for detecting special properties indicative of the quality of the milk only from the animal concerned, wherein special properties detected relating to the specific animal or its milk are used as input for further controlling the animal's way out of the monitoring milking station to a separation area.

2. Method for controlling a stable according to claim 1, wherein the monitoring milking station or stations are provided with means for medicating only the animal concerned.

3. A method according to claim 1, wherein the properties indicative of the quality of the milk detected by the detecting means of the monitoring milking station are at least one of somatic cell count, germ count, conductivity, colour deviation of the milk, and where the monitoring milking station is connected by a post-selection gate to a separation area.

4. Method for controlling a stable according to claim 1, wherein the dairy stable comprises a first waiting area with access for animals to only the monitoring milking station, and a different, second waiting area with access for animals to only the automated milking stations, wherein the method comprises leading an animal to the first waiting area if the animal has not been checked by the monitoring milking station within the last 24 hours.

5. Method for controlling a stable according to claim 4, wherein the method comprises directing the animal to the second waiting area immediately after having been milked by the monitoring milking.

6. Dairy stable for milking livestock, having at least one milking system including a plurality of milking stations, only a few of which are monitoring milking stations provided with means for registering and storing data regarding individual animals, and wherein means are provided for controlling an individual animal's access to milking via a transponder on the animal, the dairy stable being provided with a distribution system which, on the basis of the identity of the individual animal as provided by said transponder, provides access to a selected monitoring milking station at least once each day for all animals of the milking livestock irrespective of the number of animals, where at least one property indicative of the quality of the milk from the animal concerned is examined and where data regarding the animal are registered and stored by said means for registering and storing data and wherein the distribution system contains at least a waiting area for pre-selected animals that are to be directed to the selected monitoring milking station.

7. Dairy stable for milking livestock according to claim 6, wherein the distribution system ensures that an animal which has already visited a selected milking station at least once within the given time interval is only provided access again to a selected monitoring milking station within the given time interval if a predetermined part of the stock already has visited a selected milking station.

8. Dairy stable for milking livestock according to claim 7, wherein the predetermined part of the stock is between 50% and 100%.

9. Dairy stable for milking livestock according to claim 7, wherein the predetermined part of the stock is between 90% and 100%.

10. Dairy stable for milking livestock according to claim 6, wherein when an animal seeking the milking system for milking already has visited a selected monitoring milking station at least once within the given time interval, the distribution system ensures that the animal is guided to a milking station.

11. Dairy stable for milking livestock according to claim 6, wherein the plurality of milking stations are automatic milking stations.

12. Dairy stable for milking livestock according to claim 6, wherein the dairy stable comprises a post selection gate, the post selection gate being provided after the monitoring milking station and after the automated milking station, the gate being arranged for leading an animal to separation area.

* * * * *